US008667449B2

(12) United States Patent
Gunasekar (10) Patent No.: US 8,667,449 B2
(45) Date of Patent: Mar. 4, 2014

(54) FLIP-FLOP LIBRARY DEVELOPMENT FOR HIGH FREQUENCY DESIGNS BUILT IN AN ASIC FLOW

(75) Inventor: Aswin K. Gunasekar, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 126 days.

(21) Appl. No.: 12/948,481

(22) Filed: Nov. 17, 2010

(65) Prior Publication Data

US 2012/0124543 A1    May 17, 2012

(51) Int. Cl.
*G06F 9/455*    (2006.01)
*G06F 17/50*    (2006.01)

(52) U.S. Cl.
USPC ........... 716/134; 716/108; 716/111; 716/113; 716/132; 703/19

(58) Field of Classification Search
USPC ............. 716/108, 111–113, 132, 134; 703/19
See application file for complete search history.

(56) References Cited

U.S. PATENT DOCUMENTS

| 6,209,122 | B1 * | 3/2001 | Jyu et al. | 716/113 |
| 7,237,164 | B1 * | 6/2007 | Katchmart | 714/726 |
| 8,010,932 | B2 * | 8/2011 | Durham et al. | 716/133 |
| 2008/0229260 | A1 * | 9/2008 | Durham et al. | 716/1 |

OTHER PUBLICATIONS

"Analysis and Optimization of Sequential Circuit Elements to Combat Single-Event Timing Upsets", by Hamed Abrishami, Safar Hatami, and Massoud Pedram, Jun. 2, 2010 @IEEE.*

* cited by examiner

*Primary Examiner* — Nha Nguyen
(74) *Attorney, Agent, or Firm* — Williams Morgan, P.C.

(57) ABSTRACT

A method, computer program storage device and system are provided for determination and selection of optimized circuit components. The method includes performing a timing analysis on at least a portion of an electronic circuit and determining a path in the at least a portion of an electronic circuit, where the path comprises at least one storage element and an operational attribute associated with the path. The method also includes determining an optimized storage element adapted to utilize the operational attribute. The system includes a processing device and at least one of a synthesis tool, a timing tool or a place and route tool communicatively connected to the processing device. The synthesis tool, the timing tool and the place and route tool are adapted to process or analyze an electrical circuit. The system also includes a gate library communicatively connected to the at least one of a synthesis tool, a timing tool and a place r route tool, as well as a substitution unit communicatively connected to at least one of the at least one of a synthesis tool, a timing tool or a place and route tool or the gate library. The substitution unit is adapted to substitute an optimized storage element for a storage element in the electrical circuit.

13 Claims, 8 Drawing Sheets

FLIP-FLOP LIBRARY DEVELOPMENT FOR HIGH FREQUENCY DESIGNS BUILT IN AN ASIC FLOW

BACKGROUND

1. Field of the Invention

Embodiments of this invention relate generally to semiconductor circuit design and development, and, more particularly, to a method and system for determination and selection of optimized circuit components.

2. Description of Related Art

Computer circuitry has evolved from relatively simple, basic implementations to complex, high-speed designs. An increased demand for speed, features and capabilities of modern communications, computing and processing devices has driven computer circuitry become faster and smaller. Faster and smaller circuit designs have been a challenge for designers who reach the limits of currently known design techniques and strategies. Device designers have attempted to design circuits for overall, net speed gain optimizations.

Typically, at a computer circuit level, modern communications, computing and processing devices are based upon standard building block devices such as latches, flip-flops, combinatorial logic, buffers and inverters, transistors and the like. Storage elements like latches and flip-flops hold existing data values and "clock in" new values. Standard storage elements used today are optimized with respect to many different factors because modern electrical circuits are complex environments affected by many parameters. For example, the design of application specific integrated circuits (ASICs), central processing units (CPUs) and graphics processing units (GPUs) may require millions of components and/or gates, each gate having a plurality of variables which alter its behavior in the circuit. In the design of such devices according to the current state of the art, circuit components such as standard storage elements are designed such that the plurality of variables which alter their behavior are optimized for an overall efficient storage element. Such designs, however, fail to fully optimize circuit components for specific uses.

SUMMARY OF EMBODIMENTS OF THE INVENTION

In one embodiment of the present invention, a method is provided. The method includes performing a timing analysis on at least a portion of an electronic circuit and determining a path in the at least a portion of an electronic circuit, where the path comprises at least one storage element and an operational attribute associated with the path. The method also includes determining a specialized storage element adapted to utilize the operational attribute.

In another embodiment of the present invention, a system is provided. The system includes a processing device and at least one of a synthesis tool, a timing tool or a place and route tool communicatively connected to the processing device. The synthesis tool, the timing tool and a place and route tool are adapted to process or analyze an electrical circuit. The system also includes a gate library communicatively connected to the at least one of a synthesis tool, a timing tool or a place and route tool, as well as a substitution unit communicatively connected to at least one of the at least one of a synthesis tool, a timing tool or a place and route tool or the gate library. The substitution unit is adapted to substitute an optimized storage element for a storage element in the electrical circuit.

In yet another embodiment of the present invention, a non-transitive, computer readable device for storing instructions that, when executed by a processing device, performs a method is provided. The method includes performing a timing analysis on at least a portion of an electronic circuit and determining a path in the at least a portion of an electronic circuit, where the path comprises at least one storage element and an operational attribute associated with the path. The method also includes determining a specialized storage element adapted to utilize the operational attribute.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

The present invention will now be described with reference to the attached figures. Various structures, connections, systems and devices are schematically depicted in the drawings for purposes of explanation only and so as to not obscure the disclosed subject matter with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The use of any size complementary metal-oxide semiconductor (CMOS) implementation and technology is contemplated for carrying out various embodiments described herein. Additionally, non-CMOS implementations are also contemplated.

The term "storage element," as used herein, means a flip-flop, a latch, a register, a bitcell or the like, as would be understood by one of ordinary skill in the art having the benefit of this disclosure. Storage elements may be comprised of one or more storage element components such as metal oxide semiconductor field effect transistors (MOSFETs), other transistors, or the like; storage element components may also be combinations of two or more MOSFETs, other transistors, or the like. "Storage elements" may also encompass groups or arrays of the above mentioned examples. The term "electronic device" may include storage elements specifically in addition to desktop and laptop computers, servers and computing devices, electronic components (e.g., storage drives/hard drives, memory, field programmable gate arrays (FPGAs), application specific integrated circuits (ASICs), programmable logic arrays and programmable array logics (PLAs/PALs), complex programmable logic devices (CPLDs), microprocessors, microcontrollers, floppy drives, tape drives, compact disc and digital video disc (CD-ROM and DVD) drives, and the like, computer monitor devices, printers and scanners, processing devices, wireless devices, personal digital assistants (PDAs), mobile phones, portable music players, video games and video game consoles, external memory devices (e.g., Universal Serial Bus (USB) thumb drives, external hard drives, and the like), audio and video players, stereos, televisions, manufacturing equipment, automobiles and motorcycles, electrical systems in mass-transit vehicles (e.g., buses, trains, airplanes, and the like), security systems and any other device or system employing storage elements. Additionally, an "electronic device" may be an apparatus employing elements of a "storage element," as discussed above. An "electronic device" may include one or more "storage elements," one or more arrays of "storage elements," and/or one or more silicon chips.

Storage elements, e.g., flip-flops and registers, may have inherent properties or parameters such as setup times, hold times, clock-to-output times (also called propagation delays), and the like. Setup time is the least amount of time needed for data at the input port of a storage element to be present before the data can be clocked-in to the storage element via a clock trigger. Hold time is the least amount of time needed for data at the input port of a storage element to be present after the clock triggers data sampling for the storage element. Clock-to-output time is the time required by the storage element to change the value at its output terminal after the clock trigger and sampling of the data. It is noted that the setup times, hold times and clock-to-output times may vary between storage elements. The clock trigger may be rising edge or falling edge triggered for different storage elements, and timings for a storage element may vary based upon the rising edge or falling edge implementation. Similarly, setup times, hold times and clock-to-output times may vary depending upon whether the data is presented on its rising edge or falling edge. In this manner, a path in an electrical circuit may have one or more characteristics, or operational attributes, relating to the rising or falling edge of signals used in the path, as well as one or more characteristics, or operational attribute, relating to the importance of setup times, hold times, clock-to-output times, and the like with respect to the timing and efficiency of the path and path components. The specific implementation for setup times, hold times, clock-to-output times, clock edge and data edge are design specific and are not limited by the embodiments in this disclosure. It should be noted, however, that one or more embodiments presented herein may utilize these design specific considerations in order to improve circuit speed, size and/or efficiency. It is contemplated that a path in an electrical circuit may comprise one more connections between one or more circuit elements such as flip-flops, latches, registers, buffers, combinatorial logic, and the like.

The term "standard storage element" refers to storage elements, as commonly used in the industry, not having the added benefits and features described in the various embodiments of the present invention. For example, as noted in the Background above, current implementations of circuit designs may use "standard" flip-flops and latches which are generally optimized. As shown under one or more embodiments herein, a specific optimization of a storage element with respect to operational attributes of electrical circuit paths (i.e., setup times, clock-to-output times and/or hold times with respect to rising and/or falling signal edges) may lead to improved circuit timing and efficiency. "Standard storage elements" lack the optimizations described in the embodiments herein.

It is contemplated that different embodiments described herein may be implemented together in various combinations, as would be apparent to one of skill in the art having the benefit of this disclosure. That is, embodiments depicted herein are not mutually exclusive of each other and may be practiced alone, or in any combination, in accordance with the descriptions herein. Embodiments of the present invention generally provide for determination and selection of optimized storage elements for different computing and processing devices.

Figure 1:
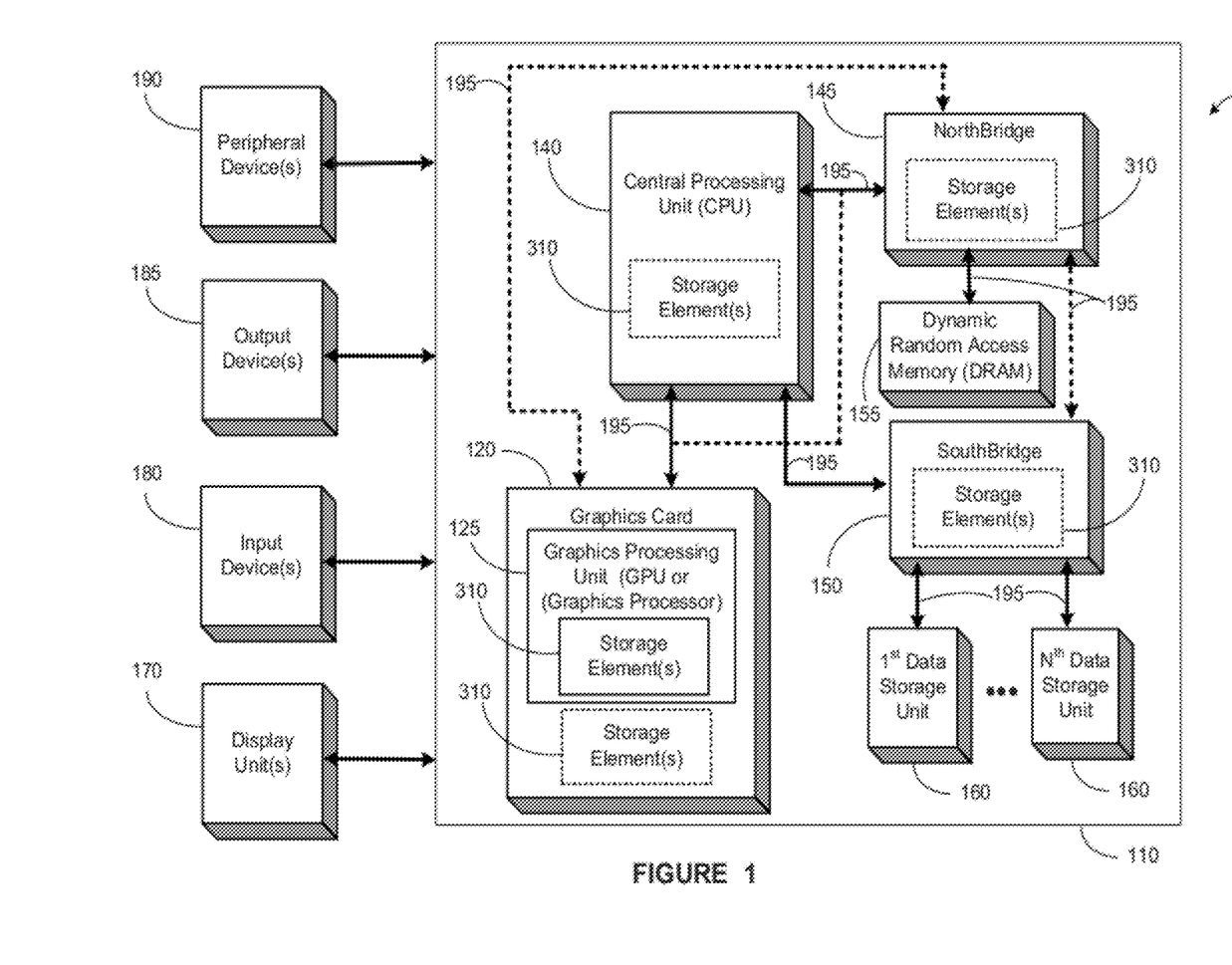
FIG. 1 schematically illustrates a simplified block diagram of a computer system including a graphics card that employs a storage scheme according to one exemplary embodiment.

Turning now to FIG. 1, a block diagram of an exemplary computer system 100, in accordance with an embodiment of the present invention, is illustrated. In various embodiments, the computer system 100 may be a personal computer, a laptop computer, a handheld computer, a mobile device, a telephone, a personal data assistant (PDA), a server, a mainframe, a work terminal, or the like. The computer system 100 includes a main structure 110 which may be a computer motherboard, circuit board or printed circuit board, a desktop computer enclosure and/or tower, a laptop computer base, a server enclosure, part of a mobile device, personal data assistant (PDA), or the like. In one embodiment, the main structure 110 includes a graphics card 120. In one embodiment, the graphics card 120 may be an ATI Radeon™ graphics card from Advanced Micro Devices ("AMD") or any other graphics card using memory, in alternate embodiments. The graphics card 120 may, in different embodiments, be connected on a Peripheral Component Interconnect (PCI) Bus (not shown), PCI-Express Bus (not shown) an Accelerated Graphics Port (AGP) Bus (also not shown), or any other connection known in the art. It should be noted that embodiments of the present invention are not limited by the connectivity of the graphics card 120 to the main computer structure 110. In one embodiment, the computer system 100 runs an operating system such as Linux, UNIX, Windows, Mac OS, or the like.

In one embodiment, the graphics card 120 may contain a graphics processing unit (GPU) 125 used in processing graphics data. The GPU 125, in one embodiment, may include a storage element 310 (discussed in further detail below with respect to FIG. 3). In one embodiment, the storage element 310 may be an array of storage elements 320 (FIG. 3) which may be part of an embedded random access memory (RAM), an embedded static random access memory (SRAM), or an embedded dynamic random access memory (DRAM), a CPU 140, GPU 120 or some other integrated circuit (IC). In alternate embodiments, the storage element 310 or array of elements 320 may be embedded in the graphics card 120 in addition to, or instead of, being embedded in the GPU 125. In various embodiments the graphics card 120 may be referred to as a circuit board or a printed circuit board or a daughter card or the like.

In one embodiment, the computer system 100 includes a central processing unit (CPU) 140, which is connected to a northbridge 145. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other connection as is known in the art. For example, the CPU 140, the northbridge 145, and the GPU 125 may be included in a single package or as part of a single die or "chips." Alternative embodiments, which alter the arrangement of various components illustrated as forming part of main structure 110, are also contemplated. The CPU 140 and/or the northbridge 145, in certain embodiments, may each include one or more storage elements 310 and/or arrays of the storage elements 310 in addition to other storage elements 310 found elsewhere in the computer system 100. In certain embodiments, the northbridge 145 may be coupled to a system RAM (or DRAM) 155; in other embodiments, the system RAM 155 may be coupled directly to the CPU 140. The system RAM 155 may be of any type of RAM known in the art. The type of RAM 155 does not limit the embodiments of the present invention. In one embodiment, the northbridge 145 may be connected to a southbridge 150. In other embodiments, the northbridge 145 and southbridge 150 may be on the same chip in the computer system 100, or the northbridge 145 and southbridge 150 may be on different chips. In one embodiment, the southbridge 150 may have the storage element 310, in addition to any other storage elements 310 elsewhere in the computer system 100. In various embodiments, the southbridge 150 may be connected to one or more data storage units 160. The data storage units 160 may be hard drives, solid state drives, magnetic tape, or any other writable media used for storing data. In various embodiments, the central processing unit 140, northbridge 145, southbridge 150, graphics processing unit 125 and/or DRAM 155 may be a computer chip or a silicon-based computer chip, or may be part of a computer chip or a silicon-based computer chip. In one or more embodiments, the various components of the computer system 100 may be operatively, electrically and/or physically connected or linked with a bus 195 or more than one bus 195.

In different embodiments, the computer system 100 may be connected to one or more display units 170, input devices 180, output devices 185 and/or other peripheral devices 190. It is contemplated that in various embodiments, these elements may be internal or external to the computer system 100, and may be wired or wirelessly connected, without affecting the scope of the embodiments of the present invention. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier or other output device. The peripheral devices 190 may be any other device which can be coupled to a computer: a CD/DVD drive capable of reading and/or writing to physical digital media, a USB device, Zip Drive, external floppy drive, external hard drive, phone and/or broadband modem, router/gateway, access point and/or the like. To the extent certain exemplary aspects of the computer system 100 are not described herein, such exemplary aspects may or may not be included in various embodiments without limiting the spirit and scope of the embodiments of the present invention as would be understood by one of skill in the art.

Figure 2:
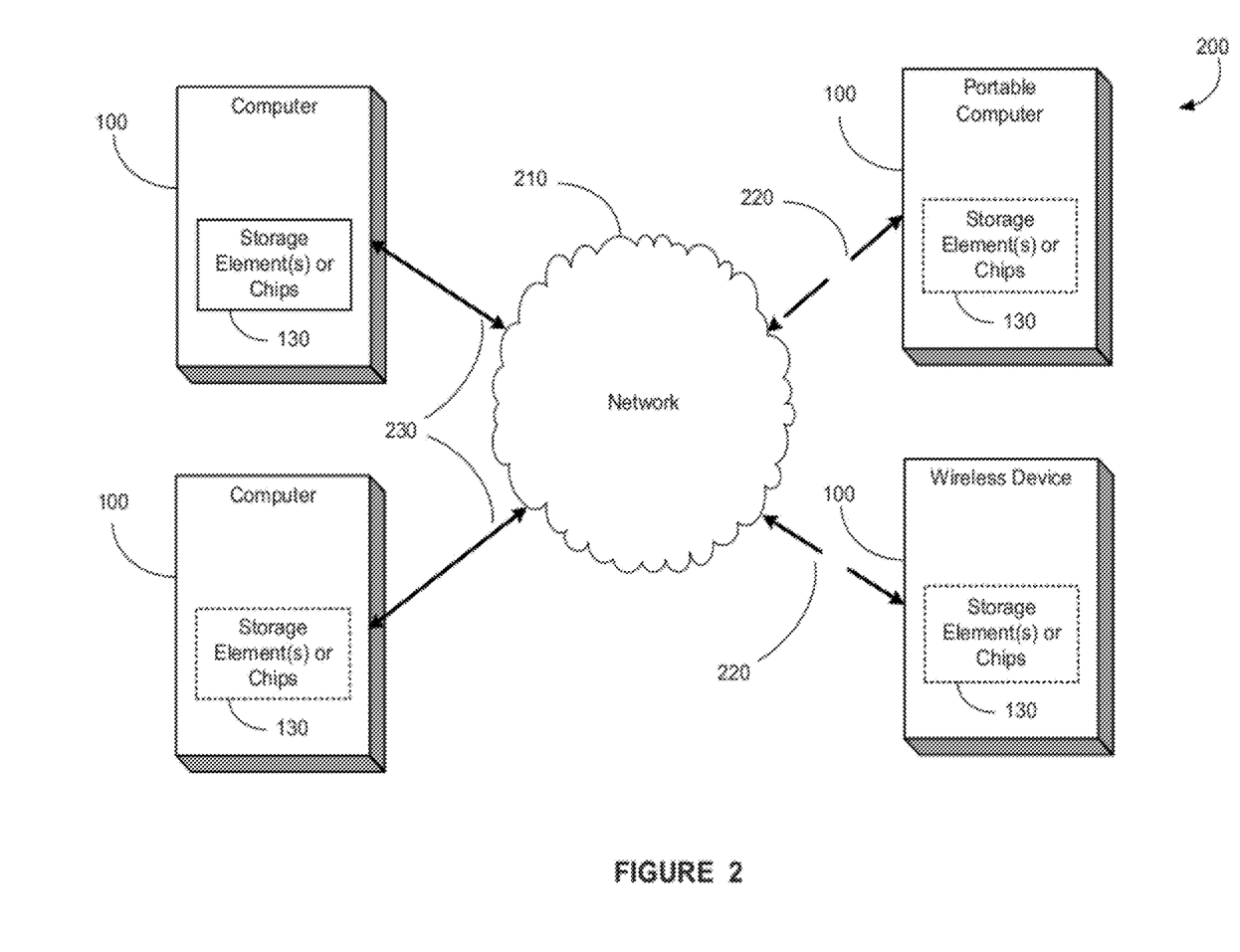
FIG. 2 shows a simplified block diagram of a multiple computer system connected via a network according to one exemplary embodiment.

Turning now to FIG. 2, a block diagram of an exemplary computer network 200, in accordance with an embodiment of the present invention, is illustrated. In one embodiment, any number of computer systems 100 may be communicatively coupled and/or connected to each other through a network infrastructure 210. In various embodiments, such connections may be wired 230 or wireless 220 without limiting the scope of the embodiments described herein. The network 200 may be a local area network (LAN), wide area network (WAN), personal network, company intranet or company network, the Internet, or the like. In one embodiment, the computer systems 100 connected to the network 200 via network infrastructure 210 may be a personal computer, a laptop computer, a handheld computer, a mobile device, a telephone, a personal data assistant (PDA), a server, a mainframe, a work terminal, or the like. The number of computers depicted in FIG. 2 is exemplary in nature; in practice any number of computer systems 100 maybe coupled/connected using the network 200.

Figures 3A, 3B:
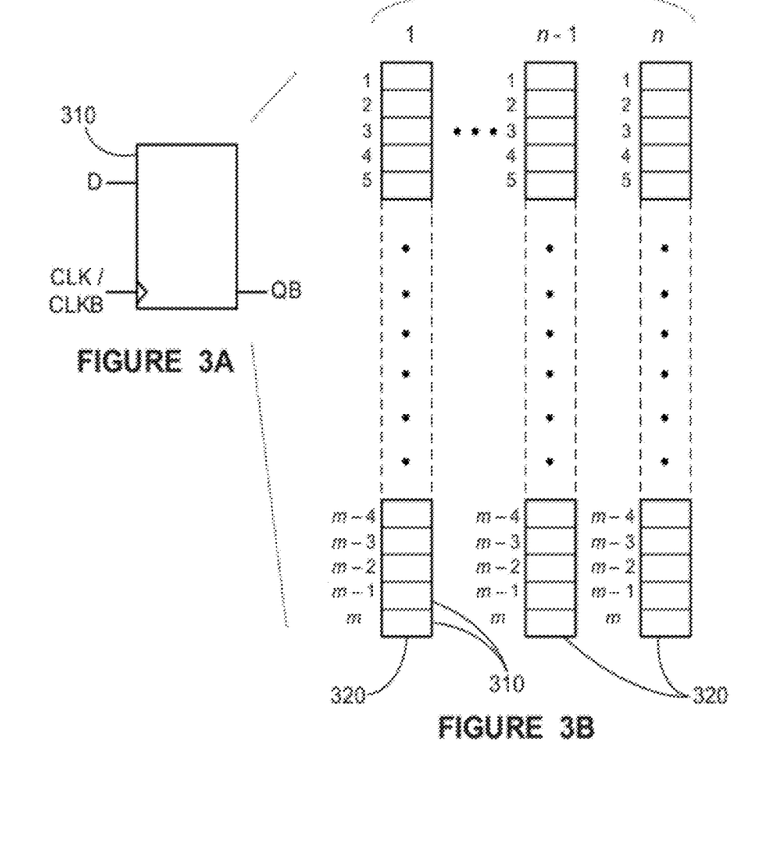
FIGS. 3A-3B illustrate a simplified, exemplary representation of a storage element, and an array of storage elements, which may be used in silicon chips, as well as devices depicted in FIGS. 1 and 2, according to one exemplary embodiment.

Turning now to FIG. 3A, a simplified, exemplary representation of the storage element 310, and an array 320 of the storage elements 310, which may be used in silicon chips 340, as well as devices depicted in FIGS. 1 and 2, according to one embodiment is illustrated. FIG. 3A depicts an exemplary embodiment of the storage element 310 (here a QB, non-scan, D flip-flop), in accordance with one embodiment; however, those skilled in the art will appreciate that the storage element 310 may take on any of a variety of forms, including those previously described above, without departing from the spirit and scope of the instant invention. The storage elements 310 may be implemented as single elements (310) or in arrays 320 or in other groups (not shown).

Turning to FIG. 3B, the array 320 is illustrated as being formed from a plurality of the storage elements 310, and may be arranged in n columns where each column consists of m rows. In other words, the array 320 may be comprised of an arrangement of "m×n" storage elements 310. It is contemplated that both m and n may be an integer greater than or equal to 1. For example, according to two specific embodiments, the array 320 may consist of a single storage element 310 (a 1×1 array, where m=1 and n=1) or may consist of 65,536 storage elements 310 (a 256×256 array, where m=256 and n=256) or consist of 256 storage elements 310 (a 256×1 array, where m=256 and n=1), or any other configuration as would be apparent to one of skill in the art having the benefit of this disclosure. As discussed above, the arrays 320 of storage elements 310 may be used in a wide variety of electronic devices, including, but not limited to, central and graphics processors, motherboards, graphics cards, combinatorial logic implementations, register banks, memory, other integrated circuits (ICs), or the like.

Figure 3C:
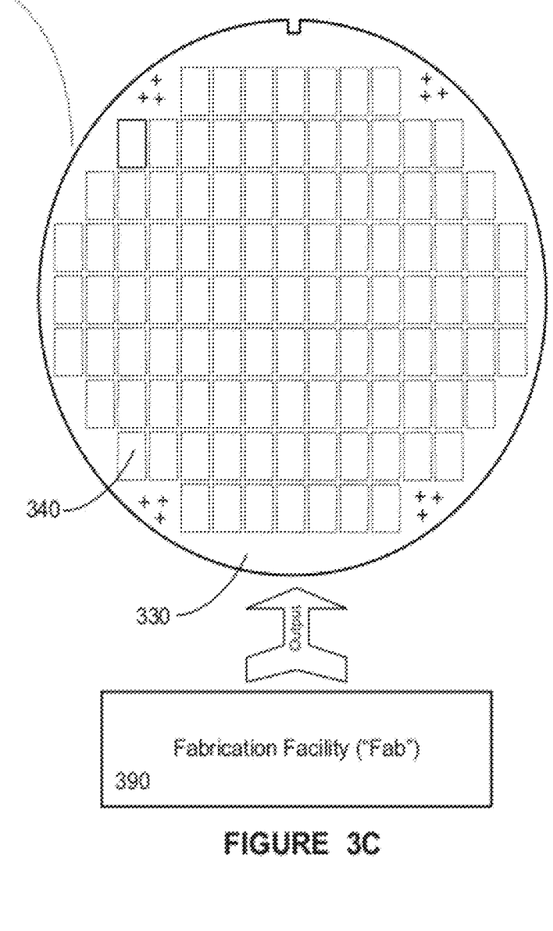
FIG. 3C illustrates a simplified, exemplary representation of a semiconductor fabrication facility used to produce a semiconductor wafer or product, according to one exemplary embodiment.

Turning now to FIG. 3C, in accordance with one embodiment, one or more of the arrays 320 of the storage elements 310 may be included on the silicon chip 340 (or computer chip). The silicon chip 340 may contain one or more different configurations of the arrays 320 of the storage elements 310. The silicon chips 340 may be produced on a silicon wafer 330 in a fabrication facility (or "fab") 390. That is, the silicon wafers 330 and the silicon chips 340 may be referred to as the output, or product of, the fab 390. The silicon chips 340 may be used in electronic devices, such as those described above in this disclosure.

Figure 4:
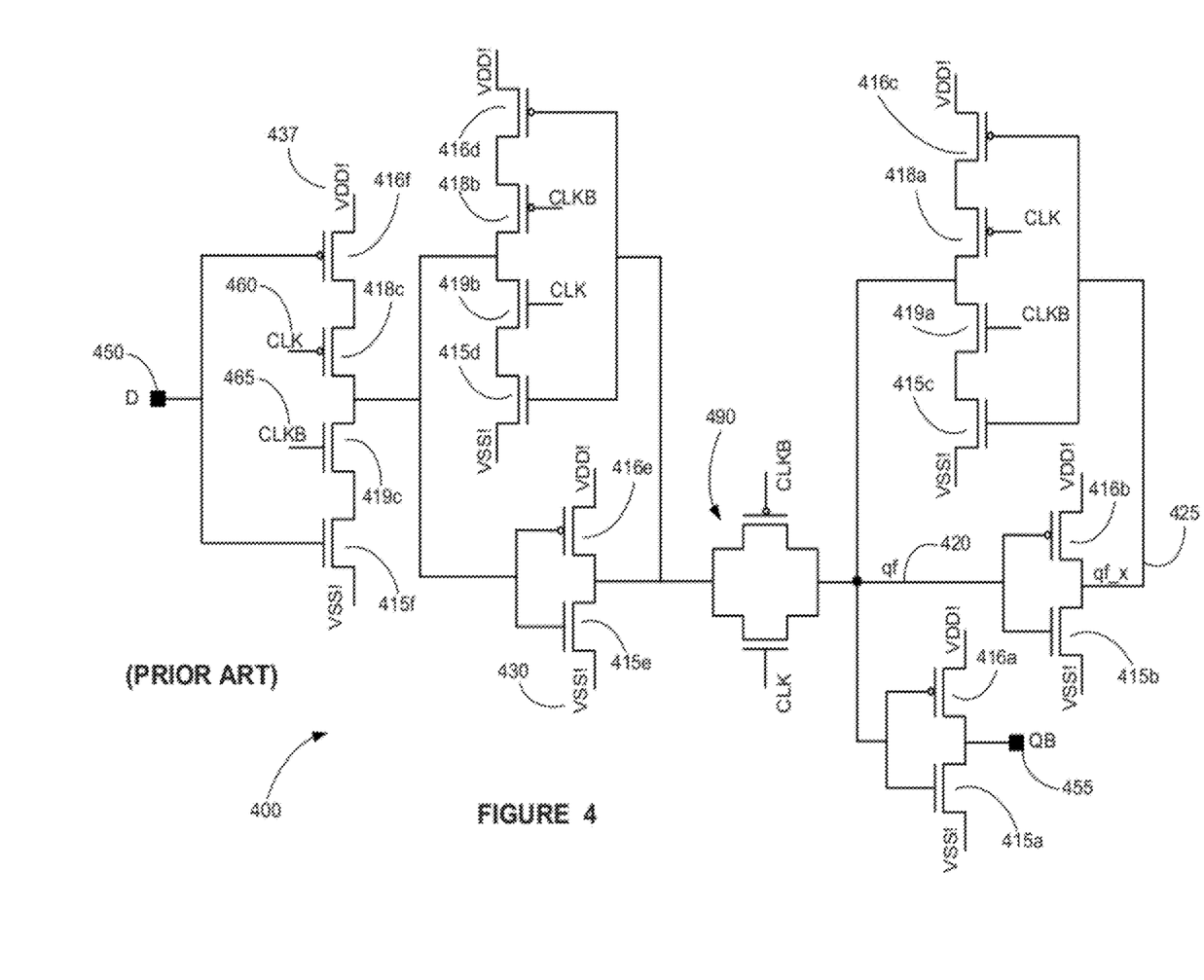
FIG. 4 illustrates detailed, exemplary representation of a standard, non-optimized prior art storage element.

Turning now to FIG. 4, a detailed representation of a standard prior art storage element 400 is depicted. The storage element 400 depicted is exemplified as a standard, inverted output flip-flop. The prior art storage element 400 is depicted as a configuration of metal oxide semiconductor field effect transistors (MOSFETs). The MOSFETs depicted are shown as n-type (nFET) and p-type (pFET) MOSFETs, as would be apparent to one of skill in the art having the benefit of this disclosure. The prior art storage element 400 includes a power node (VDD!) 437 (as called a "non-ground potential node" herein) and a ground node (VSS!) 430. The power node VDD! 437 is connected to various components of the prior art storage element 400 via pFETs 416a-f, and the ground node VSS! 430 is connected to various components of the prior art storage element 400 via nFETs 415a-f. The prior art storage element 400 includes an input terminal 450 ("D") and an inverted output terminal 455 ("QB"). The value provided at input 450 is clocked in using clocking signals CLK 460 and CLKB 465 as well as a clocking component 490. Clocking signals CLK 460 and CLKB 465 are presented to clocking gates of the pFETs and nFETs as shown in FIG. 4. Once clocked in, the input value is stored at a storage node 420 ("qf"). A corresponding inverted input value is stored in a storage node 425 ("qf_x"). An inverted storage value, corresponding to the value stored at storage node 420, is presented at the inverted output terminal 455.

Still referring to FIG. 4, the implementations of standard prior art storage elements (400) use configurations where multiple optimizations are made to a single standard storage element 400. For example, setup time, hold time and clock-to-output time may all be adjusted in a single standard storage element 400 in order to improve overall performance and efficiency. By adjusting many parameters of the standard storage element 400, designers may use a component library that contains relatively few components (standard storage elements 400) which may be implemented in many electrical circuit paths with acceptable results. The use of a smaller, simpler library allows designers to select the types of standard storage elements 400 to be used in the design of an electrical circuit such as an ASIC, CPU or GPU. However, this kind of design flow cannot take advantage of full optimizations of specific parameters (e.g., setup time, hold time and clock-to-output with respect to rising and falling edges of signals) in standard storage elements 400 because of the tremendous complexity of modern-day electrical circuits. In other words, because blanket optimizations are made to standard storage elements 400, current design schemes have inherent inefficiencies.

Figure 5:
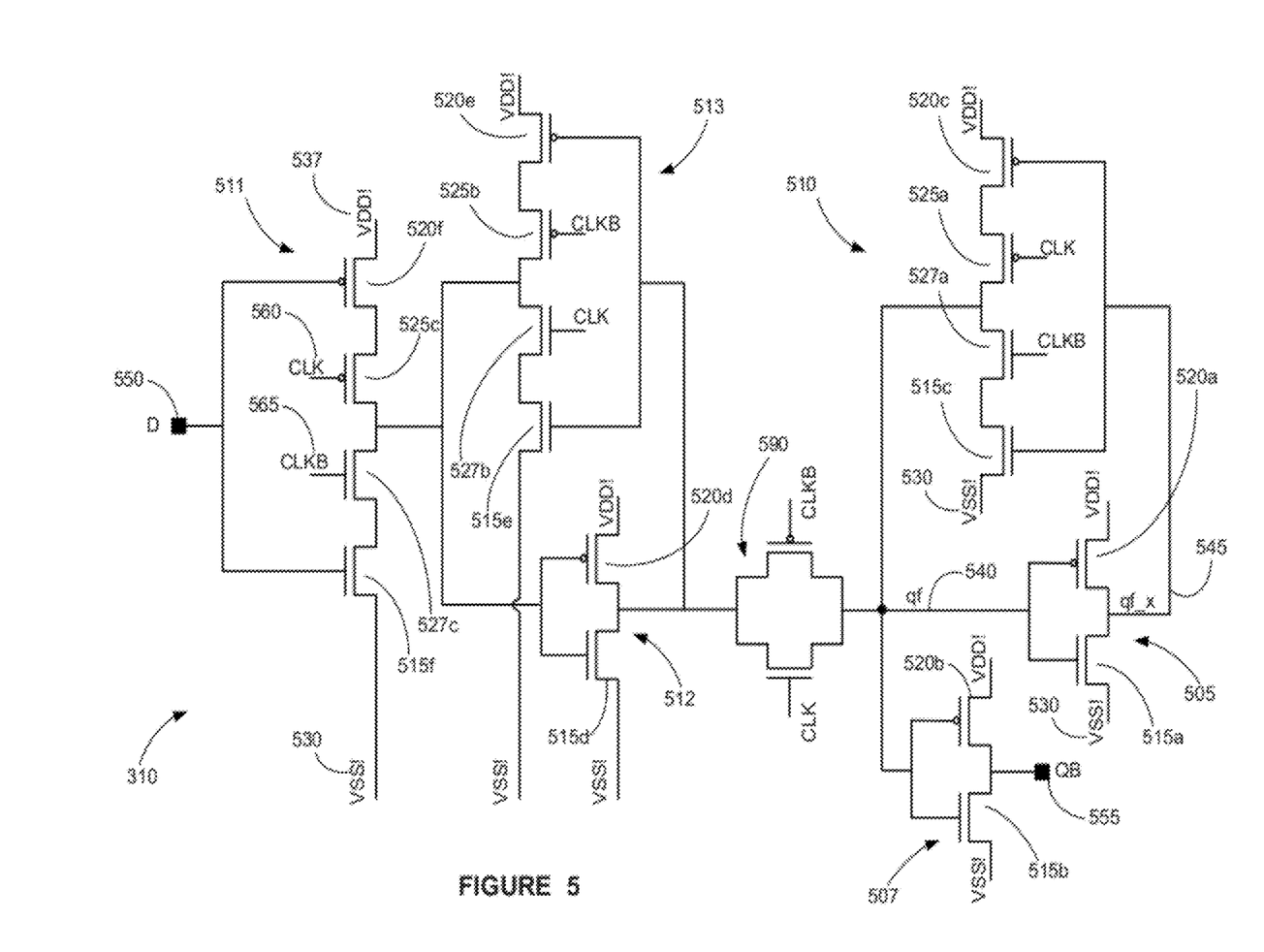
FIG. 5 illustrates a detailed representation of an optimized storage element, according to one exemplary embodiment.

Turning now to FIG. 5, a detailed and exemplary embodiment of the storage element 310 is depicted. As depicted in FIG. 5, the storage element 310 may be, in some embodiments, a flip-flop. The storage element 310 depicted in FIG. 5 is an inverted-output, D flip-flop, in accordance with one or more embodiments. The storage element 310 is depicted as a configuration of n-type (nFET) and p-type (pFET) MOSFETs, as would be apparent to one of skill in the art having the benefit of this disclosure. The storage element 310 includes a power node (VDD!) 537 (also called a "non-ground potential node" herein) and a ground node (VSS!) 530. The power node VDD! 537 is connected to various components of the storage element 310 via pFETs 520a-520f, and the ground node VSS! 530 is connected to various components of the storage element 310 via nFETs 515a-515f. The storage element 310 includes an input terminal 550 ("D") and an inverted output terminal 555 ("QB"). Clocking signals CLK 560 and CLKB 565 as well as a clocking component 590 are used to controllably pass any value presented at the input terminal 550. The clocking signal CLK 560 is presented to the clocking gates of the pFETs 525a, 525c and the nFET 527b, and the clocking signal CLKB 565 is presented to the clocking gates of the pFET 525b and the nFETs 527a, 527c. Once clocked in, the input value presented at the input terminal 550 is stored at a storage node 540 ("q"). A corresponding inverted input value is stored in a storage node 545 ("qf_x"). An inverted storage value, corresponding to the value stored at the storage node 540, is presented at the inverted output terminal 555.

Still referring to FIG. 5, in the illustrated exemplary embodiment, the storage element 310 may include a pair of cross-coupled inverters (an inverter 505 and an inverter 510), as well as additional inverters 507, 511, 512 and 513. In an exemplary embodiment, as shown in FIG. 5, the inverter 505 includes the nFET 515a connected to the ground node VSS! 530 and to the pFET 520a, the pFET 520a also being connected to the power node VDD! 537. The storage element 310 may also include the clocking component 590 which may be connected to the inverter 512 and to the inverters 505, 510 as shown in FIG. 5. In one embodiment, the gates of the inverter 505 are connected to the storage node 540, and the storage node 545 is connected to the drain of the nFET 515a and the drain of the pFET 520a, as shown in FIG. 5. In one embodiment, the inverter 510 may include the nFET 515c being connected to the ground node VSS! 530 and to the nFET 527a that has its gate coupled to the clocking signal CLKB 565. The nFET 527a may be connected to the pFET 525a that has its gate coupled to the clocking signal CLK 560. The pFET 525a may in turn be connected to the pFET 520c (the pFET 520c also being connected to the power node VDD! 537). In one embodiment, the gates of the nFET 515c and the pFET 520c of the inverter 510 are connected to the storage node 545, and the storage node 540 is connected to the drain of the nFET 527a and the drain of the pFET 525a as shown in FIG. 5. Such a configuration may allow the pair of cross-coupled inverters 505 and 510 to drive each other. The inverter 507 may include the nFET 515b which may be connected to the ground node VSS! 530. The inverter 507 may also include the pFET 520b which may be connected to the power node VDD! 537. The drains of the nFET 515b and the pFET 520b may be connected together and also connected to the inverted output terminal 555. Additionally, the gates of the nFET 515b and the pFET 520b may be connected together and also connected to the storage node 540 and the clocking component 590 as shown in FIG. 5.

In the exemplary illustrated embodiment, the inverter 511 may include the nFET 515f which may be connected to the ground node VSS! 530 and to the nFET 527c that has its gate coupled to the clocking signal CLKB 565. The nFET 527c may be connected to the pFET 525c that has its gate coupled to the clocking signal CLK 560. The pFET 525c may in turn be connected to the pFET 520f (the pFET 520f also being connected to the power node VDD! 537). In one embodiment, the gates of the nFET 515f and the pFET 520f of the inverter 511 may be connected to the input node 550, and the output of the inverter 511 (i.e., the drain of the nFET 527c and the drain of the pFET 525c) may be connected to the gates of the nFET 515d and the pFET 520d of the inverter 512 as well as to the output of the inverter 513 (i.e., the drain of the nFET 527b and the drain of the pFET 525b), as shown in FIG. 5. With respect to the inverter 512, the pFET 520d may be connected to the power node VDD! 537 and to the nFET 515d; the nFET 515d may also be connected to the ground node VSS! 530. The output of the inverter 512 (i.e., the drain of the nFET 515d and the drain of the pFET 520d) may be connected to the gates of the nFET 515e and the pFET 520e of the inverter 513. With respect to the inverter 513, the nFET 515e may be connected to the ground node VSS! 530 and to the nFET 527b that has its gate coupled to the clocking signal CLK 560. The nFET 527b may be connected to the pFET 525b that has its gate coupled to the clocking signal CLKB 565. The pFET 525b may in turn be connected to the pFET 520e (the pFET 520f also being connected to the power node VDD! 537).

Figure 6:
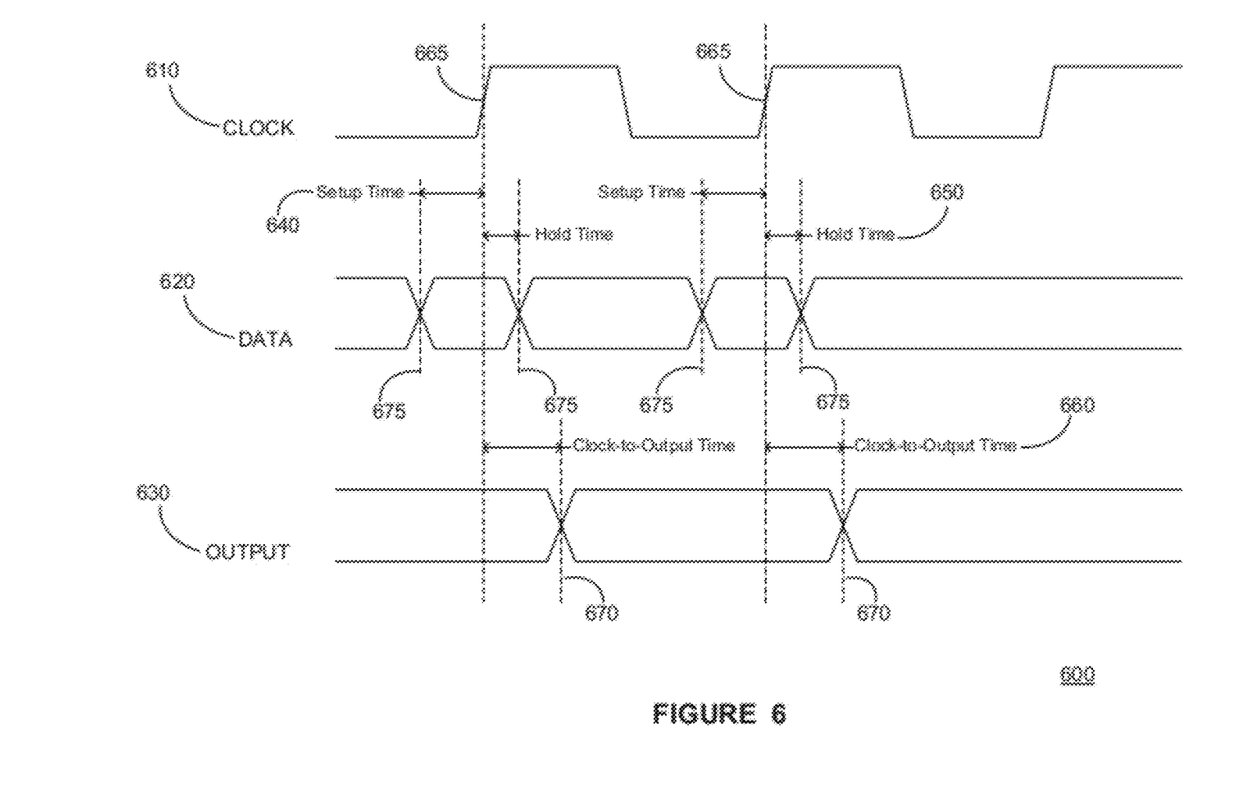
FIG. 6 illustrates a detailed representation of a timing diagram for the optimized storage element of FIG. 5, according to one exemplary embodiment.

Referring now to FIGS. 5 and 6, an illustrative, exemplary embodiment relating to optimization of setup time 640, clock-to-output time 660, and/or hold time 650 is depicted. That is, the storage element 310 may be skewed to optimize one of the setup time 640, the clock-to-output time 660, and/or the hold time 650; this optimization, in one embodiment, may be accomplished with respect to a specific edge of a data value presented at the input terminal 550. Put another way, a path in an electrical circuit may often work off of a specific edge of the data and/or the clock signals in the path (e.g., the rising edge of the signal or the falling edge of the signal). By focusing on optimizations for a specific edge of a specific signal, improved timing optimizations may be obtained. FIG. 6 shows an exemplary illustration of a timing diagram 600. FIG. 6 shows a clock signal 610, a data signal 620 and an output signal 630 of the illustrated, exemplary embodiment of the storage element 310 of FIG. 5. FIG. 6 also illustrates signal transitions: a rising edge clock transition 665, an output transition 670 of the storage element 310 (i.e., when new output is presented at the inverted output terminal 555), and a data transition 675 (i.e., when new data is presented at the input terminal 555).

The setup time 640 is the least amount of time necessary for data at the input port of a storage element to be present before the data can be clocked-in to the storage element via a clock trigger. With respect to FIG. 6, the setup time 640 may be shown as the time between the data transition 675 and the next subsequent rising edge clock transition 665. With respect to FIG. 5, setup time 640 may be described as the least amount of time that data needs to be present at input terminal 550 in order for the data value to stabilize in the inverters 511, 512 and 513 before the data value is clocked in by the clocking component 590. In other words, the data presented at the input terminal 550 must be "put" into the inverters 511, 512 and 513 before the data can be clocked into the storage nodes 540, 545 of the storage element 310. According to one embodiment, it may be possible to improve the setup time 640 by sizing several of the MOSFETs of the storage element 310 to increase their size and drive strength, and skewing particular MOSFETs of the storage element 310 for specific edges of the data.

For example, in one embodiment, it may be noted that a path in an electrical circuit utilizes the rising edge of the data signal, and therefore skewing one or more of the storage elements 310 in the path for the rising edge of the data signal may be desirable. It may also be noted that the path should be optimized to reduce the setup time 640 in order to improve overall path and/or electrical circuit timing and/or efficiency. In order to optimize the storage element 310 for the setup time 640 on the rising edge of the data signal, it may be desirable to focus only on optimization for the rising edge of the data signal without optimizing other configurations for the storage element 310. To this end, it may be necessary to increase the size and drive strengths for the nFET 515f and the nFET 527c of the inverter 511, for the pFET 520d of the inverter 512, and for the nFET 515e and the nFET 527b of the inverter 513. In accordance with one or more embodiments, the MOSFETs may be sized by increasing their respective $\beta$ ratios. In this illustrative example of the depicted embodiment of the storage element 310 in FIG. 5, when the data is presented on its rising edge at the input terminal 550, the data is transitioning from low to high, or from '0' to '1', thus the data is on its rising edge. To input a value of '1' presented at the input terminal 550, the nFET 515f and the nFET 527c of the inverter 511 will turn on because nFETs are activated by presenting a value of '1' at their gates. For this reason, it may be desired to size the nFET 515f and the nFET 527c of the inverter 511 for increased drive strength and/or switching speed. If an input value of '1' is presented at the input terminal 550, then output of the inverter 511 will be '0'. This value ('0') is then presented as the input to the inverter 512 (i.e., to the gates of the nFET 515d and the pFET 520d), and because pFETs are activated by presenting a value of '0' at their gates, the pFET 520d will be activated. For this reason, the pFET 520d may be sized to increase drive strength and/or switching speed. Because the pFET 520d is active, the output of the inverter 512 will be '1', and therefore the input to the inverter 513 will be '1' (i.e., a value of '1' is presented to the gates of the nFET 515e and the pFET 520e). When a value of '1' is input into the inverter 513, the nFET 515e will activate and the output of the inverter 513 will be '0'; it is to be noted that this value matches the output of the inverter 511 which is connected to the output of the inverter 511.

Using the configuration described immediately above to skew the storage element 310 for optimization on the rising edge of the data signal, the storage element 310 may be optimized to utilize the operational attributes of a rising edge data signal with respect to the setup time 640 for a path of an electrical circuit, thus producing an optimized storage element 310. As an illustrative example, such an optimization may significantly improve the ability of the storage element 310 to reduce the setup time 640 for inputting a data signal with a rising edge. In an implementation of the standard storage element 400, an overall optimization is used to provide for reasonably faster setup times 640 on both the rising and falling edges of an input data signal. For example, the standard storage element 400 may be optimized to allow for a setup time 640 of approximately 15 ps on both the rising and falling edges of the input data signal. While this optimization allows for some flexibility in the implementations and use of the standard storage element 400, it fails to obtain further reductions of setup time 640 which could be used in certain paths of an electrical circuit. In contrast to the standard storage element 400 optimization, the exemplary, illustrated embodiment described with respect to FIGS. 5 and 6 may allow, for example, an optimization of the storage element 310 for the setup time 640 on the rising edge of a data signal to be reduced to approximately 9 ps while the falling edge setup time 640 may increase to approximately 17 ps-18 ps. Yet, because some paths in electrical circuits have the operational attribute of mainly, primarily or exclusively using a data signal on its rising edge, the illustrated embodiment may be used with improved results in such paths for decreasing the setup times 640.

Still referring to FIGS. 5 and 6, the clock-to-output time 660 is the time required by the storage element to change the value at its output terminal after the clock trigger and sampling of the data. With respect to FIG. 6, the clock-to-output time 660 may be shown as the time between the rising edge clock transition 665 and the next subsequent output transition 670. With respect to FIG. 5, the clock-to-output time 660 may be conceptualized as the time from when the clocking signal CLK 560 signal clocks in the input data (presented at the input terminal 550 and passed via the inverters 511 and 512) at the clocking component 590 to the time when the data is presented at the inverted output terminal 555. As shown in FIG. 5, the inverter 507 lies in the clock-to-output path. As such, in one or more embodiments, it may be desirable to optimize the MOSFETs of the inverter 507 for drive strength and/or switching speed in a similar manner as described above with respect to the optimization of the setup time 640 in the storage element 310 for the rising edge of a data signal. For example, assuming the same desire to optimize the storage element 310 for the rising edge of an input data signal, the clocking component 590 may clock in a value of '1' into the storage node 540. Therefore, a value of '1' may be presented as an input to the inverter 507. In other words, a value of '1' is presented to the gates of the nFET 515b and the pFET 520b. Because an nFET will activate when a value of '1' is presented on its gate, the nFET 515b will activate, and a value of '0' will be presented at the inverted output terminal 555. In such a scenario, it may be desirable to size the nFET 515b to by increasing its drive strength and/or switching speed. In alternative embodiments, it may be desirable to optimize for the falling edge of the data signal input at the input terminal 550. In such an embodiment, the pFET 520b may be sized to increase its drive strength and/or switching speed.

Still referring to FIGS. 5 and 6, the hold time 650 is the least amount of time needed for data at the input port of a storage element to be present after the clock triggers data sampling for the storage element. With respect to FIG. 6, the hold time 650 may be shown as the time between the rising edge clock transition 665 and the next subsequent data transition 675. The storage elements 310 may also be configured to reduce the hold times 650. By using the storage element 310 optimized for decreased the hold time 650, the storage element 310 may be used in a path of an electrical circuit with the operational attribute of excessive hold times 650 causing timing issues. Standard storage elements 400 optimized for many parameters and/or overall efficiency fail to fully optimize for paths having operational attributes of clock-to-output delays. These standard storage elements 400 require that their electrical circuit paths have additional buffering to accommodate for excessive hold times 650. Additional buffering increases required die area for component placement, increases power consumption and complicates routing.

According to the embodiments described herein, the storage elements 310 may be specifically optimized to take advantage of operational attributes of electrical circuit paths. Such storage elements 310 may be said to be a specialized storage element(s) 310 or an optimized storage element(s) 310. The specialized storage elements 310 may also serve to reduce the overall area required for the storage elements 310 and their accompanying logic by allowing for fewer buffering and/or correctional logical elements in an electrical circuit. In turn, this may also allow for fewer of the storage elements 310 to be needed in a gate library of a synthesis tool, a place and route tool, a timing tool, or some other software analysis tool which uses a gate library (shown below with respect to FIG. 7).

It should be noted that other paths with alternate operational attributes such as, but not limited to, falling or rising edges of data or clock signals with respect to the setup times 640, the clock-to-output times 660 and/or the hold times 650 may be implemented in manners similar to those illustrative embodiments presented herein. Optimizations at inputs and outputs of the storage elements 310 are contemplated and within the scope of embodiments of the present invention. It is also contemplated, in various embodiments, that other MOSFETs, singly, in pairs and/or in multiple MOSFET groups, may be sized and/or skewed in a manner similar to that described immediately above. It should also be noted that in one or more embodiments, the number of the specialized storage elements 310 may be limited in number in order to prevent additional hold time issues in an electrical circuit. In one embodiment, the number of the specialized storage elements 310 is limited to approximately 8% to 10% of the total number of the storage elements 310 in the electrical circuit. In another embodiment, the number of the specialized storage elements 310 is limited to approximately 4% to 14% of the total number of the storage elements 310 in the electrical circuit. It is contemplated, however, that in various embodiments, the number of the specialized storage elements 310 may not be limited with respect to the total number of the storage elements 310 in the electrical circuit. In some cases, an electrical circuit (e.g., an ASIC, a CPU, a GPU or the like) operating at 1.5 GHz may see an overall increase of over 100 MHz in improved performance using the illustrated optimizations.

Figure 7:
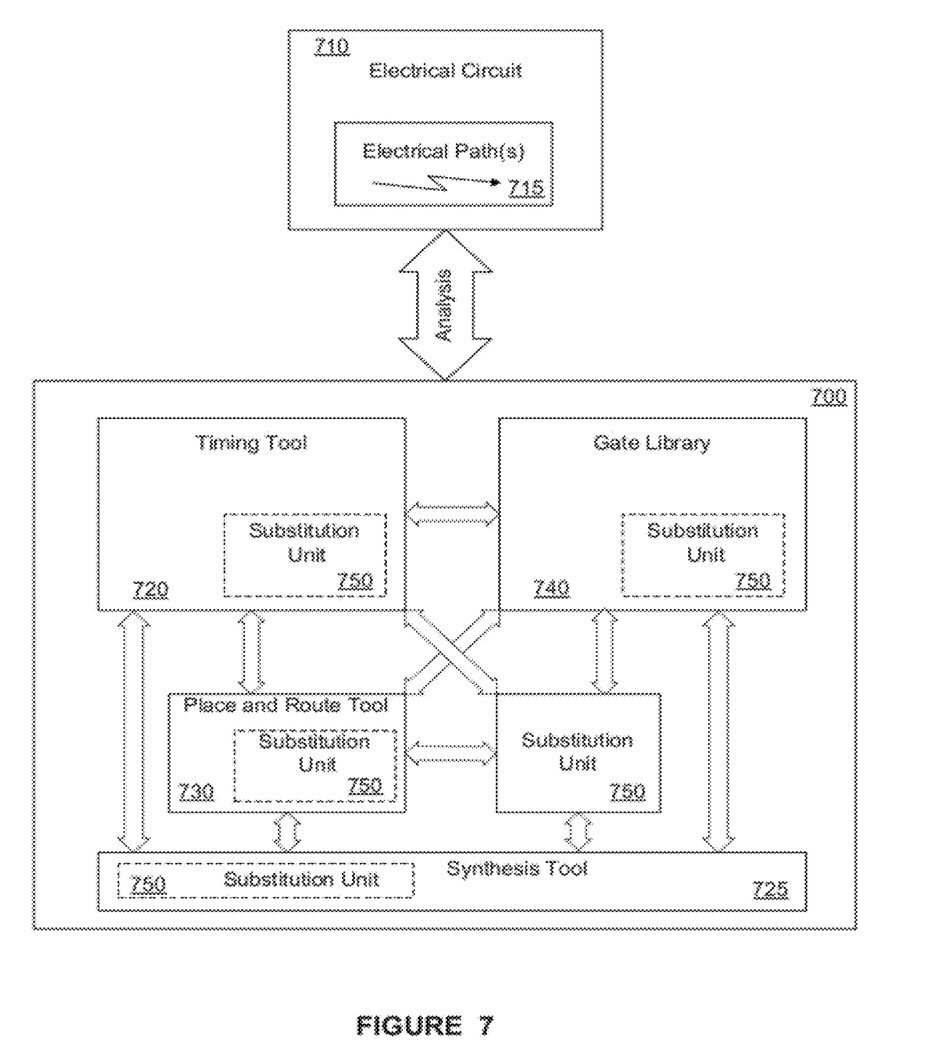
FIG. 7 illustrates a block diagram of an exemplary storage element library development system, according to one exemplary embodiment.

Turning now to FIG. 7, a block diagram of an exemplary embodiment of a storage element library development system 700 is depicted. The storage element library development system 700 may be implemented in one or more processing devices, computer systems 100 and/or data storage systems or the like. The storage element library development system 700 may include one or more design tools such as a synthesis tool 725, a timing tool 720, a place and route tool 730, a gate library 740 and/or a substitution unit 750. In one or more embodiments the synthesis tool 725, the timing tool 720, the place and route tool 730, the gate library 740 and/or the substitution unit 750 may be hardware devices, software modules or a combination of both. In one embodiment, the synthesis tool 725, the timing tool 720 or the place and route tool 730 may perform an analysis on an electrical circuit 710 having one or more electrical paths 715. The synthesis tool 725, the timing tool 720 or the place and route tool 730 may focus on a particular electrical path 715 in the electrical circuit 710 that may be problematic or that may require timing improvement. The electrical path 715 upon which the synthesis tool 725, the timing tool 720 or the place and route tool 730 focuses may contain one or more of the standard storage elements 400 and one or more of the storage elements 310. In one or more embodiments, the electrical path 715 may be determined and/or modeled based upon a hardware design language description of the electrical path 715 such as VHDL, Verilog, Vera, GDS/GDS-II, or the like. One or more of the storage elements 310/standard storage elements 400 may work off of a common data or clock edge in the electrical circuit 710. The synthesis tool 725, the timing tool 720 or the place and route tool 730 or a substitution unit 750 may determine that one or more of the standard storage elements 400 may be replaced with one of the specialized or the optimized storage elements 310 that is optimized to take advantage of the common data or clock edge in order to improve some element of the electrical path 715 timing.

In one or more embodiments, other operational attributes may be analyzed and/or determined. For example, the data or clock edges may be rising or falling. Similarly, the electrical path 715 may have setup time 640, clock-to-output time 660 and/or hold time 650 attributes considered in the timing and/or electrical path 715 analyses. The optimized storage element 310 that may be substituted into the electrical path 715 may also be added to a gate library 740 for current and/or future use and development. The gate library 740 may be used by designers and/or by automated processing tools and/or computer systems to replace or substitute one or more standard storage elements 400 with the optimized storage elements 310. Additionally, the synthesis tool 725, the timing tool 720, the place and route tool 730, the gate library 740 and/or the substitution unit 750 may all, or in any sub-combination, be communicatively connected. In one or more embodiments, the substitution unit 750 may be included in the synthesis tool 725, the timing tool 720, the place and route tool 730 and/or the gate library 740. Additionally, the synthesis tool 725, the timing tool and 720 or the place and route tool 730 may, after performing an analysis on or processing of the electrical circuit 710, provide and/or add a list of the storage elements 310 and/or the optimized storage elements 310 to the gate library 740. In one or more embodiments, the list of the storage elements 310 and/or the optimized storage elements 310 may be later implemented to improve timing and/or save space/die area and/or power consumption in the electrical circuit 710. In one or more embodiments, improving timing and/or saving space/die area and/or power consumption may be accomplished by substituting or replacing the standard storage elements 400 in the electrical paths 715 of the electrical circuit 710 with the optimized storage elements 310 in the gate library 740. In other words, the design library 740 may be adapted to provide a plurality of possible optimized storage elements 310 for use in an electrical circuit 710 to at least one of a storage element designer, a design tool, a layout tool, the synthesis tool 725, the timing tool 720, the place and route tool 730, a circuit designer or the like.

Figure 8:
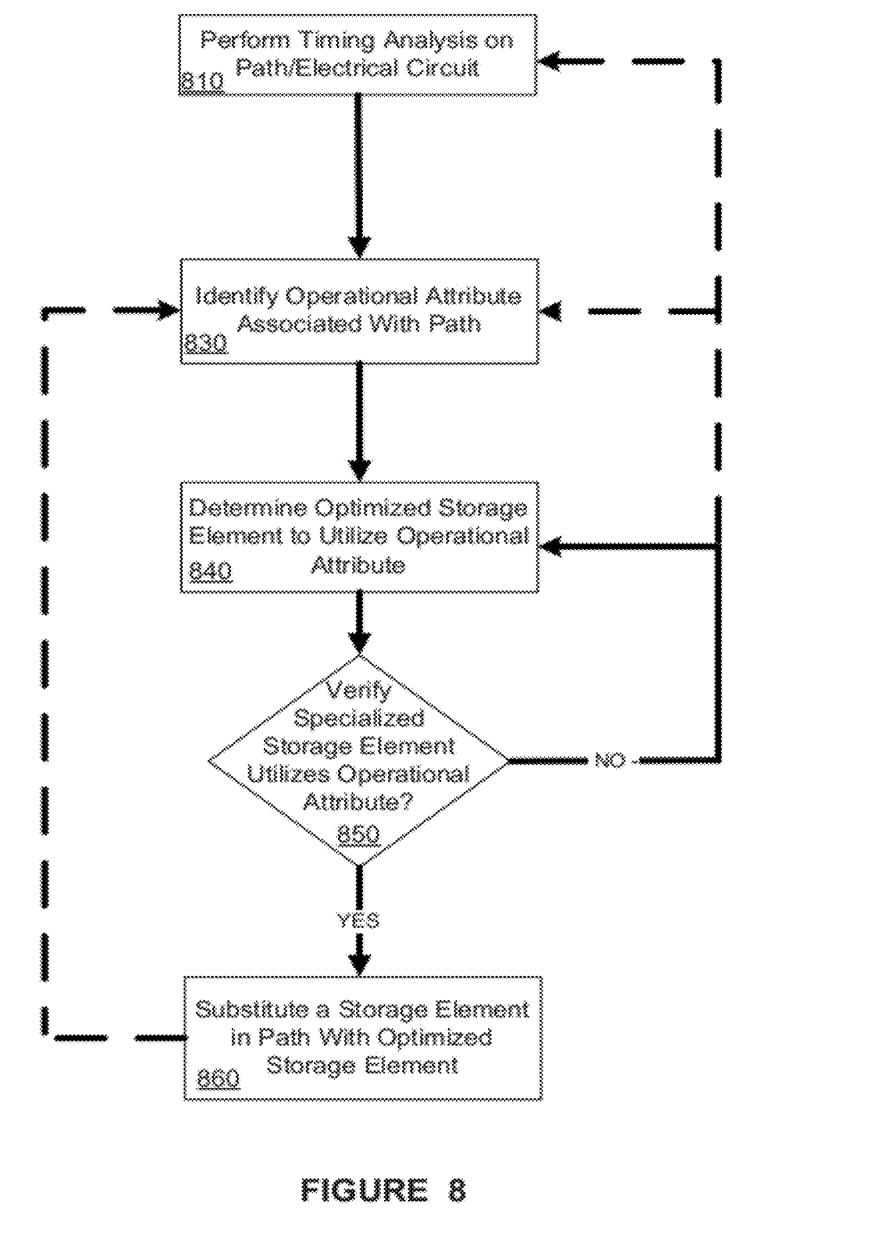
FIG. 8 illustrates an operational flowchart for determining an optimized storage element, according to one exemplary embodiment.

Turning now to FIG. 8, an operational flowchart for determining the optimized storage element 310 according to one embodiment of the present invention is depicted. At step 810, a timing analysis is performed on an electrical circuit 710. The timing analysis may be performed on the entire circuit or upon a portion of the electrical circuit 710. The timing analysis may be performed and/or focus on one or more specific electrical path 715 in the electrical circuit 710. The electrical path 715 in the electrical circuit 710 may be identified as needing improvement with respect to one or more attributes. Typically, the electrical path 715 includes one or more of the storage element 310. In one or more embodiments, the storage element 310 components may be MOSFETs, other transistors, inverters, cross-coupled inverters, combinations thereof, or the like. At step 830 an operational attribute associated with the electrical path 715 is determined. Typically, the operational attribute may be one or more of the setup time 640, the hold time 650, the clock-to-output time 660, a rising edge of a signal or the falling edge of a signal, or the like.

After the operational attribute is determined, the flow proceeds to step 840 where the optimized storage element 310 is determined. Typically, the optimized storage element 310 is optimized to utilize the identified operational attribute (step 830). The flow then moves to optional step 850 where it is verified whether the determined optimized storage element 310 utilizes the operational attribute determined in step 840. If not, the flow may return to step 840 where the optimized storage element 310 may be re-determined, or alternatively, the flow may return to one of the other preceding steps to repeat the operations therein. If the determined optimized storage element 310 utilizes the operational attribute determined in step 840, the flow proceeds to step 860. At step 860, the determined optimized storage element 310 may be substituted for one or more of the standard storage elements 400 in the electrical path 715. Optionally, the flow may then return to step 830 and repeat for alternate electrical paths 715, standard storage elements 400 and/or storage elements 310.

It is further contemplated that, in some embodiments, different kinds of hardware descriptive languages (HDL) may be used in the process of designing and manufacturing very large scale integration circuits (VLSI circuits) such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate Graphic Database System (GDS) data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., the data storage unit(s) 160, the RAM 155, compact discs, DVDs, solid state storage and the like). In one embodiment, the GDSII data (or other similar data) may be adapted to configure a manufacturing facility (e.g., through the use of mask works) to create devices capable of embodying various aspects of the instant invention. In other words, in various embodiments, this GDSII data (or other similar data) may be programmed into a computer 100, processor 125/140 or controller, which may then control, in whole or part, the operation of a semiconductor manufacturing facility (or fab) 390 to create semiconductor products and devices. For example, in one embodiment, silicon wafers 330 containing various configurations of asymmetrically sized and/or skewed storage elements 310 optimized for leakage reduction may be created using the GDSII data (or other similar data).

It should also be noted that while various embodiments may be described in terms of storage elements optimized for leakage reduction, it is contemplated that the embodiments described herein may have a wide range of applicability, not just for specific implementations described here, as would be apparent to one of skill in the art having the benefit of this disclosure.

The particular embodiments disclosed above are illustrative only, as the invention may be modified and practiced in different but equivalent manners apparent to those skilled in the art having the benefit of the teachings herein. Furthermore, no limitations are intended to the details of construction or design as shown herein, other than as described in the claims below. It is therefore evident that the particular embodiments disclosed above may be altered or modified and all such variations are considered within the scope and spirit of the claimed invention.

Accordingly, the protection sought herein is as set forth in the claims below.

What is claimed:

1. A method comprising:
performing, by a processing device, a timing analysis on an electronic circuit path, the path comprising at least one storage element and comprising an operational attribute associated with the path; and
determining an optimized storage element adapted to utilize the operational attribute, wherein the determining comprises sizing a first plurality of transistors of the storage element and skewing a second plurality of transistors of the storage element to optimize a setup time, a hold time, or a clock-to-output time at a specific edge of a data value applied at an input of the path.

2. The method of claim 1, further comprising substituting at least one of the at least one storage element with the optimized storage element.

3. The method of claim 1, wherein determining an optimized storage element further comprises adding the optimized storage element to a design library.

4. The method of claim 3, wherein determining an optimized storage element is performed by a processing device.

5. A storage element library development system, comprising:
a processing device;
at least one design tool communicatively connected to the processing device, the at least one design tool being adapted to process or analyze at least one path in an electrical circuit;
a gate library communicatively connected to the at least one design tool; and
a substitution unit communicatively connected to at least one of the design tool or the gate library, the substitution unit being adapted to substitute an optimized storage element for a storage element in the electrical circuit,
wherein the storage element library development system is adapted to:
perform a timing analysis on at least a portion of an electronic circuit;
determine a path in the at least a portion of an electronic circuit, the path comprising at least one storage element and comprising an operational attribute associated with the path;
determine an optimized storage element adapted to utilize the operational attribute, wherein the operational attribute comprises at least one of a setup time attribute, a hold time attribute or a clock-to-output time attribute, wherein the determining comprises sizing a first plurality of transistors of the storage element and skewing a second plurality of transistors of the storage element to optimize the operational attribute at a specific edge of a data value applied at an input of the path.

6. The storage element library development system of claim 5, wherein the design tool comprises at least one of a synthesis tool, a timing tool or a place and route tool.

7. The storage element library development system of claim 5, wherein the specific edge comprises at least one of a rising clock edge or a falling clock edge.

8. The storage element library development system of claim 5, wherein determining an optimized storage element further comprises adding the optimized storage element to a design library.

9. The storage element library development system of claim 8, wherein the design library is adapted to provide a plurality of possible optimized storage elements for use in an electrical circuit to at least one of a storage element designer, the design tool, a synthesis tool, a layout tool, a timing tool, a place and route tool or a circuit designer.

10. A non-transitive, computer readable device for storing instructions that, when executed by a processing device, perform a method comprising:
performing a timing analysis on at least a portion of an electronic circuit path, the path comprising at least one storage element and comprising an operational attribute associated with the path; and
determining an optimized storage element adapted to utilize the operational attribute, wherein the determining comprises sizing a first plurality of transistors of the storage element and skewing a second plurality of transistors of the storage element to optimize a setup time, a hold time, or a clock-to-output time at a specific edge of a data value applied at an input of the path.

11. A non-transitive, computer readable device for storing instructions that, when executed by a processing device, perform the method of claim 10, further comprising substituting at least one of the at least one storage element with the optimized storage element.

12. A non-transitive, computer readable device for storing instructions that, when executed by a processing device, perform the method of claim 10, wherein determining an optimized storage element further comprises adding the optimized storage element to a design library.

13. A non-transitive, computer readable device for storing instructions that, when executed by a processing device, perform the method of claim 12, wherein determining an optimized storage element is performed by a processing device.

* * * * *